(12) United States Patent
Fortmann et al.

(10) Patent No.: US 8,283,803 B2
(45) Date of Patent: Oct. 9, 2012

(54) WIND FARM AND METHOD FOR OPERATION OF A WIND FARM

(75) Inventors: Jens Fortmann, Berlin (DE); Friedrich Koch, Kevelar (DE)

(73) Assignee: RePower Systems AG, Hamburg (DE)

( * ) Notice: Subject to any disclaimer, the term of this patent is extended or adjusted under 35 U.S.C. 154(b) by 215 days.

(21) Appl. No.: 12/612,496

(22) Filed: Nov. 4, 2009

(65) Prior Publication Data
US 2011/0101690 A1    May 5, 2011

(51) Int. Cl.
*H02J 1/10* (2006.01)
(52) U.S. Cl. ............... 307/43; 307/11; 307/84; 307/85; 290/44; 290/55
(58) Field of Classification Search ............... 307/11, 307/43, 84; 290/44, 55; 416/132; 322/32
See application file for complete search history.

(56) References Cited

U.S. PATENT DOCUMENTS

| | | | |
|---|---|---|---|
| 6,924,565 B2 | 8/2005 | Wilkins et al. | |
| 7,298,059 B2 * | 11/2007 | Delmerico et al. | 307/85 |
| 7,679,215 B2 * | 3/2010 | Delmerico et al. | 307/57 |
| 2005/0042098 A1 * | 2/2005 | Wobben | 416/132 B |
| 2007/0001461 A1 * | 1/2007 | Hopewell | 290/44 |
| 2007/0097565 A1 * | 5/2007 | Oohara et al. | 361/20 |
| 2007/0228838 A1 * | 10/2007 | Delmerico et al. | 307/84 |
| 2008/0088131 A1 * | 4/2008 | Thisted | 290/44 |
| 2008/0093856 A1 * | 4/2008 | Stiesdal | 290/44 |
| 2008/0106099 A1 * | 5/2008 | Ichinose et al. | 290/44 |
| 2009/0021014 A1 * | 1/2009 | Letas | 290/44 |
| 2009/0096211 A1 * | 4/2009 | Stiesdal | 290/44 |

FOREIGN PATENT DOCUMENTS

| | | |
|---|---|---|
| DE | 19620906 | 1/1998 |
| DE | 10 2008 018 748 A1 | 10/2009 |
| GB | 2 410 386 | 7/2005 |
| GB | 2410386 A * | 7/2005 |
| WO | WO-2006/120033 A2 | 11/2006 |

OTHER PUBLICATIONS

Cartwright, P. et al. (2004). "Co-ordinated voltage control strategy for a doubly-fed induction generator (DFIG)-based wind farm," IEE Proceedings of Generation Transmission and Distribution 151(4): 495-502.

European Search Report mailed Oct. 12, 2011 directed towards counterpart application No. EP09014431; 4 pages.

* cited by examiner

*Primary Examiner* — Jared Fureman
*Assistant Examiner* — Alfonso Perez Borroto
(74) *Attorney, Agent, or Firm* — Morrison & Foerster LLP

(57) ABSTRACT

A wind farm in which electrical power produced in the wind farm is transported via a wind-farm-internal network to a substation. Upon being transferred to an external network, the electrical power is transformed to a voltage which is higher by a selectable step-up ratio than the voltage in the wind-farm-internal network. The electrical load level on a wind energy installation in the wind farm is determined, and the step-up ratio is adjusted as a function of the electrical load level. Accordingly, it is possible to influence the voltage in the wind-farm-internal network such that the wind energy installations are subject to a lower electrical load level.

14 Claims, 3 Drawing Sheets

WIND FARM AND METHOD FOR OPERATION OF A WIND FARM

FIELD OF THE INVENTION

The invention relates to a method for operation of a wind farm, in which the electrical power which is produced in the wind farm is transported via a wind-farm-internal network to a substation. Before being transmitted to an external network, the electrical power is transformed to a voltage which is higher by a selectable step-up ratio than the voltage in the wind-farm-internal network. The invention also relates to a wind farm having a substation at which electrical power produced in the wind farm is transmitted from a wind-farm-internal network to an external network. The wind farm has a stepping switch for adjustment of the step-up ratio between the voltage in the wind-farm-internal network and the voltage in the external network, and has a wind farm regulator which presets a step-up ratio on the stepping switch.

BACKGROUND OF THE INVENTION

In wind farms, the electrical power produced by the wind energy installations is normally passed to a substation via a medium-voltage network at a voltage of, for example, 20 kV. To be transmitted to the external network, which is generally a high-voltage network, the electrical power is changed to a voltage of, for example, 110 kV, by means of a transformer. If the voltage in the high-voltage network changes, the voltage in the medium-voltage network can thus be kept constant by varying the step-up ratio between the high voltage and the medium voltage. This is known in the prior art.

As is known, wind energy installations for electricity generation are dependent on the capability to emit the electrical power at a specific voltage to the wind-farm-internal network and in this case the voltage may differ only slightly from the rated voltage. If the voltage is below the rated voltage, a higher current level is necessary in order nevertheless to be able to emit the rated power. Higher current levels can lead to an increased load on electrical components of the wind energy installation, such as the generator, cables, transformer etc. In order to prevent overloading, the wattless component is normally first of all limited in a situation such as this, before the real power is limited. In contrast, if the voltage in the wind-farm-internal network is above the rated voltage, then this can likewise lead to overloading of components of the wind energy installation, for example by the converter being overloaded. The voltage must therefore be within a narrow band above and below the rated voltage in order that the wind energy installation can emit the rated power and can at the same time comply with the wattless component requirements. Even if the wind energy installation is still operated within the permissible range, the load on the wind energy installation rises when operation is in the vicinity of the system limits. Operation at the edge of the system limits leads to a reduced wind energy installation life, and to increasing maintenance effort.

SUMMARY OF THE INVENTION

Against the background of the prior art mentioned initially, the invention is based on the object of providing a method for operation of a wind farm and of providing a wind farm by means of which it is possible to reduce the load on wind energy installations in the wind farm. The object is achieved by the features broadly disclosed herein. Advantageous embodiments are specified in the disclosure.

According to the invention, in the case of the method, the electrical load level on a wind energy installation in the wind farm is determined, and the step-up ratio between the voltage in the wind-farm-internal network and the voltage in the external network is adjusted as a function of the electrical load level on the wind energy installation.

First of all, some of the terms used will be explained. A wind farm comprises at least one wind energy installation, although generally a plurality of wind energy installations, in which rotation energy of a rotor is converted by a generator to electrical energy. The electrical power is passed via a wind-farm-internal network to a substation, where it is transformed to a higher voltage and is transmitted to an external network. The ratio between the voltage in the external network and the voltage in the wind-farm-internal network is referred to as the step-up ratio. The step-up ratio can be chosen, within the scope of the invention, that is to say it can be varied in a plurality of steps or continuously variably.

In the prior art, stepping switches are known as a means for varying the step-up ratio. For example, stepping switches are used in the networks of the major utility supply organizations to allow voltage fluctuations in the high-voltage networks without this at the same time being associated with voltage fluctuations at the medium-voltage level. With regard to wind energy installations, it has been proposed in WO 2006/120033 A2 that stepping switches be used in order to comply with the wattless component requirements of the external network. When the stepping switch is operated, the voltage of the wind-farm-internal network changes. The regulators for the individual wind energy installations compensate for the voltage change by either increasing or decreasing the proportion of the wattless component.

The electrical load level on a wind energy installation is the load level which results in electrical power flowing through components of the wind energy installation. For example, the electrical load level can be determined on, the basis of the ratio between the instantaneous volt-amperes (or actual current) and the maximum possible volt-amperes (or actual current).

According to the invention, the electrical load level is determined, for example, by considering the operating point of the wind energy installation and checking the magnitude of the separation between the operating point and the system limits of the wind energy installation. For example, if the voltage at the present operating point is so high there is a threat of the converter being overloaded, then the operating point is linked to a high electrical load level. In contrast, if the voltage is so low that the electrical components of the wind energy installation, such as the generator, cables, and transformer are heated by the increased current level, the electrical load level is likewise high. If the electrical load level is found to be high, then the method according to the invention can be used to vary the step-up ratio, which leads to a new voltage being present in the wind-farm-internal network. The wind energy installation can emit the electrical power that is produced at the new voltage, and is therefore at an operating point which is associated with a lower electrical load level. The load on the wind energy installation is reduced.

In one advantageous embodiment, the electrical load level on the wind energy installation is determined by comparing the voltage U and a wattless component Q of the electrical power produced in the wind energy installation with a U-Q family of characteristics, in which case the wattless component should be understood to be a generic term which covers the various representation options such as reactive current, reactive power, phase angle etc. A U-Q family of characteristics should be understood as follows. The generator in a wind energy installation produces the electrical power at low voltages which are generally between 400 V and 6 kV. Before being transmitted to the wind-farm-internal network, the electrical power is brought to a medium voltage of, for example, 20 kV, by means of a transformer which is part of the wind energy installation. The wind energy installation transformer transmits not only the real component but also the wattless component of the electrical power. As is known, the capability of the transformer to transmit the wattless component depends on the voltage at which the transformer is operated. At one end of the permissible voltage range, the wind energy installation can produce a capacitive wattless component without any restriction (overexcited operation), while, when transmitting an inductive wattless component (underexcited operation) it reaches its system limits more quickly. At the other end of the permissible voltage range, the wind energy installation can produce an inductive wattless component well, while it reaches its system limits more quickly when transmitting a capacitive wattless component. This relationship is described in detail in DE 10 2008 018 748. If one considers a U-Q family of characteristics derived from this knowledge, then, in comparison to the rectangular shape which one would expect if the capability to transmit the wattless component were to be the same over the entire permissible voltage range, two corners are missing. The shape of the U-Q family of characteristics therefore approximates to a rhombus. If the U-Q family of characteristics is considered at the wind-farm-internal network end, then the capability to feed a capacitive wattless component at high voltage and the capability to feed an inductive wattless component at low voltage are reduced. The mathematical signs at the generator end are the inverse of this. The voltage U is preferably considered at the wind-farm-internal network end, for the purposes of the invention, although it is likewise possible to consider this at the generator end. The U-Q family of characteristics changes depending on how much power the wind energy installation is emitting. For example, if the real power is relatively low, a greater proportion of wattless component can be fed in. The rhombus-like form of the U-Q family of characteristics remains unchanged, however.

If one considers the wind energy installation operating point defined by the voltage U and the wattless component Q, and compares this with the U-Q family of characteristics, then it is possible to use a low electrical load level of the wind energy installation as the basis when the operating point is well away from all the limits of the U-Q family of characteristics. The electrical load level therefore becomes greater as the operating point approaches a limit of the U-Q family of characteristics. When the operating point in this case approaches a limit of the U-Q family of characteristics where one corner is missing in comparison to a rectangle, then the traditional reaction would be to reduce the wattless component Q and accept that the wind energy installation can no longer comply with the wattless component requirement. Instead of this, for the purposes of the invention, the voltage in the wind-farm-internal network can be changed by varying the step-up ratio. The operating point of the wind energy installation is therefore moved away from the limits of the U-Q family of characteristics, and the electrical load level on the wind energy installation is reduced. The freedom obtained in this way can be used to increase the wattless component Q so as to once again comply with the reactive power requirement.

Instead of considering only the separation between the operating point and the limits of the U-Q family of characteristics, it is possible to read for each operating point in the family of characteristics whether it will be possible to provide additional capacitive or inductive wattless components if required. The capability to provide additional capacitive or inductive wattless components is referred to as the wattless component margin. The invention includes the idea of varying the step-up ratio between the wind-farm-internal voltage and the voltage of the external network as a function of whether the operating point of the wind energy installation offers an adequate wattless component margin.

A wind farm normally comprises a plurality of wind energy installations. If the step-up ratio between the wind-farm-internal voltage and the voltage in the external network changes, then this does not affect one individual wind energy installation, but all the wind energy installations in the wind farm. If the method according to the invention is carried out in such a way that the step-up ratio is changed even when one individual wind energy installation is subject to a high electrical load level, then, although this makes it possible to reduce the electrical load level on this wind energy installation, it may, however, at the same time in some circumstances increase the electrical load level on the other wind energy installations. The step-up ratio is preferably changed only when the electrical load level on a plurality, or a predetermined number, of wind energy installations in the wind farm has exceeded predetermined limits.

Stepping switches which can be used to vary the step-up ratio are subject to a high level of wear and will withstand only a limited number of switching processes. It is therefore desirable to change the step-up ratio only when the gain resulting from the reduction in the load on the wind energy installations is greater than the loss caused by the wear to the stepping switch. This can be achieved, for example, by operating the stepping switch only when a relatively stringent condition is satisfied. For example, the condition may be that an increased electrical load level must be signaled if it lasts for a predetermined time period of, for example, more than 1 minute or more than 10 minutes. Other criteria could be that the wind farm overall is no longer able to produce the required wattless component, or that temperature limits are being exceeded in the wind energy installations. Furthermore, the switching of the stepping switch can be made dependent on whether one switching process or a specific number of switching processes has or have already taken place within a predetermined time interval of, for example, 30 minutes, 24 hours or one month.

The decision as to whether the stepping switch is switched can be made dependent, in particular, on the following criteria. A mean value of the voltage over time may be considered, with the stepping switch then being switched only when the mean value is above a predetermined limit value for a predetermined time period. This makes it possible to prevent the stepping switch from being switched by short voltage fluctuations. Furthermore, the time period before the next regular servicing of the wind energy installation may be considered. If it is assumed that a stepping switch can carry out only a predetermined number of switching processes between two servicings, then it is possible to determine at any time how many switching processes are still possible before the next servicing. If the time period before the next servicing is still long and only a small number of switching processes are still available, the criteria for initiating a switching process can be raised, or vice versa. Furthermore, the initiation of a switching process can be made dependent on a cost/benefit assessment. It is easily possible to calculate on the basis of the number of switching processes between two servicings and the costs of a servicing what costs will be associated with a single switching process. Information is likewise available as to the costs which are incurred, for example, by a reduction in the power that can be fed in because of a high electrical load level on the wind energy installation. If, for example, one switching process costs EURO 25 and the reduction in the power that is fed in 15 minutes results in costs of EURO 25, then a switching process is economically worthwhile when this allows the wind energy installation to be operated at full power for a time period of more than 15 minutes, instead of the power that is fed in being reduced. The decision on operation of the stepping switch can be made dependent on one or more of the abovementioned criteria. An assessment module can be provided in the wind farm regulator to make this decision. The assessment module can also be designed to select a suitable U-Q family of characteristics from a plurality of U-Q families of characteristics depending on the instantaneous real power output and/or a voltage mean value and/or a state variable of the stepping switch.

If the electrical load level on wind energy installations in the wind farm is very high, that is to say the operating point is well away from the desired range, then the stepping switch can vary the step-up ratio by a plurality of steps in one switching process. Conversely, it need not necessarily be a precondition for variation of the step-up ratio that one or more wind energy installations is or are reaching its or their power limits. If the wind energy installations are so far away from their system limits that it is possible to increase the voltage without reaching the system limits, then the voltage increase can be carried out in order to reduce the electrical losses and to increase the efficiency.

When the step-up ratio is switched and the voltage in the wind-farm-internal network in consequence changes, then, in some circumstances, the wind energy installation control system attempts to counteract the voltage change and to once again regulate the voltage at the old value. In most cases, a wind energy installation reaction such as this is undesirable. The reaction can be avoided by presetting new nominal values for the voltage and/or the wattless component for the wind energy installation when the step-up ratio is switched. The wind energy installation is therefore supplied with the information that the change in the wind-farm-internal network is desirable, and that this should not be counteracted.

The voltage level in the wind-farm-internal network can also be influenced to a lesser extent than by means of a stepping switch by using active or passive compensation measures. One example of this is the connection or disconnection of capacitances in the wind-farm-internal network. It is worthwhile linking the method according to the invention with the compensation control such that minor changes are first of all implemented by means of the wind-farm-internal compensation, and such that the stepping switch is operated only when a major change is required.

The wind farm according to the invention is designed to carry out the method according to the invention. The invention provides for the wind farm regulation to preset the step-up ratio for the stepping switch as a function of the electrical load level of one wind energy installation. Since the appropriate step-up ratio is preset and the voltage in the wind-farm-internal network is adjusted in this way, the wind energy installations in the wind farm can be operated at an operating point at which the wind energy installations are subject to a low load.

A family of characteristics memory is preferably provided in which a U-Q family of characteristics that does not have a rectangular shape is stored. The U-Q family of characteristics can be used to determine the magnitude of the electrical load level to which a wind energy installation is subject. A logic module can be provided directly for this purpose for the wind energy installation, which compares the voltage U and the wattless component Q of the electrical power fed into the wind-farm-internal network with the U-Q family of characteristics. If the comparison leads to the result that the wind energy installation is subject to an increased electrical load level, then an appropriate signal can be sent to the wind farm regulator. The wind farm regulator can check whether the conditions exist for switching of the stepping switch. By way of example, the condition may be that more than one or more than half of the wind energy installations in the wind farm are signaling an increased load level.

Alternatively or additionally, a logic module can be provided on the wind farm regulator, which compares the voltage U and the wattless component Q of the wind-farm-internal network with the U-Q family of characteristics. Various factors can lead to the voltage in the wind-farm-internal network not being the same everywhere. The values for the voltage U and the wattless component Q at the substation to the external network therefore need not necessarily match the corresponding values at the individual wind energy installations. Nevertheless, a statement relating to the electrical load level on the individual wind energy installations can be derived from central measured values of the voltage U and the wattless component Q in the wind-farm-internal network, and it is possible to define conditions in which the stepping switch will be operated in order to vary the step-up ratio. For example, switching of the stepping switch can be provided when the wind farm receives a new wattless component preset from the outside and it is possible to determine simply on the basis of a central comparison with the U-Q family of characteristics that the wind energy installations will not be able to meet the new wattless component preset because the electrical load level would be excessive.

The stepping switch can be arranged separately, or can be physically connected to the transformer. In order to make it possible to react quickly, while the operating points of the wind energy installations are well away from the desired points, the stepping switch can be designed such that it carries out a change over a plurality of switching steps when required in one switching process. In addition, for fine adjustment of the voltage in the wind-farm-internal network, a wattless-component source which is independent of the wind energy installations can be provided, which can be connected and disconnected. The wattless-component source can be provided with open-loop or closed-loop control. A plurality of combinations of stepping switch and transformer can also be connected in parallel in order to achieve redundancy.

The electrical power can first of all be transported via a connecting line to the external network. This is feasible, for example, when the wind farm is an off-shore wind farm and the electrical power is passed via the connecting line to the coast, or when the wind farm is at a long distance from the closest connection point to the public power distribution network. A first stepping switch can be arranged at a first end of the connecting line, and a second stepping switch at a second end of the connecting line, with the two stepping switches being controlled or regulated by the wind farm regulator. The voltage in the wind-farm-internal network can in this way be selected independently of the voltage in the public power distribution network, and it is possible to counteract a voltage drop over the connecting line by switching one of the two stepping switches.

BRIEF DESCRIPTION OF THE DRAWINGS

The invention will be described in the following text using one advantageous embodiment, by way of example, and with reference to the attached drawings, in which.

DETAILED DESCRIPTION OF THE INVENTION

Figure 1:
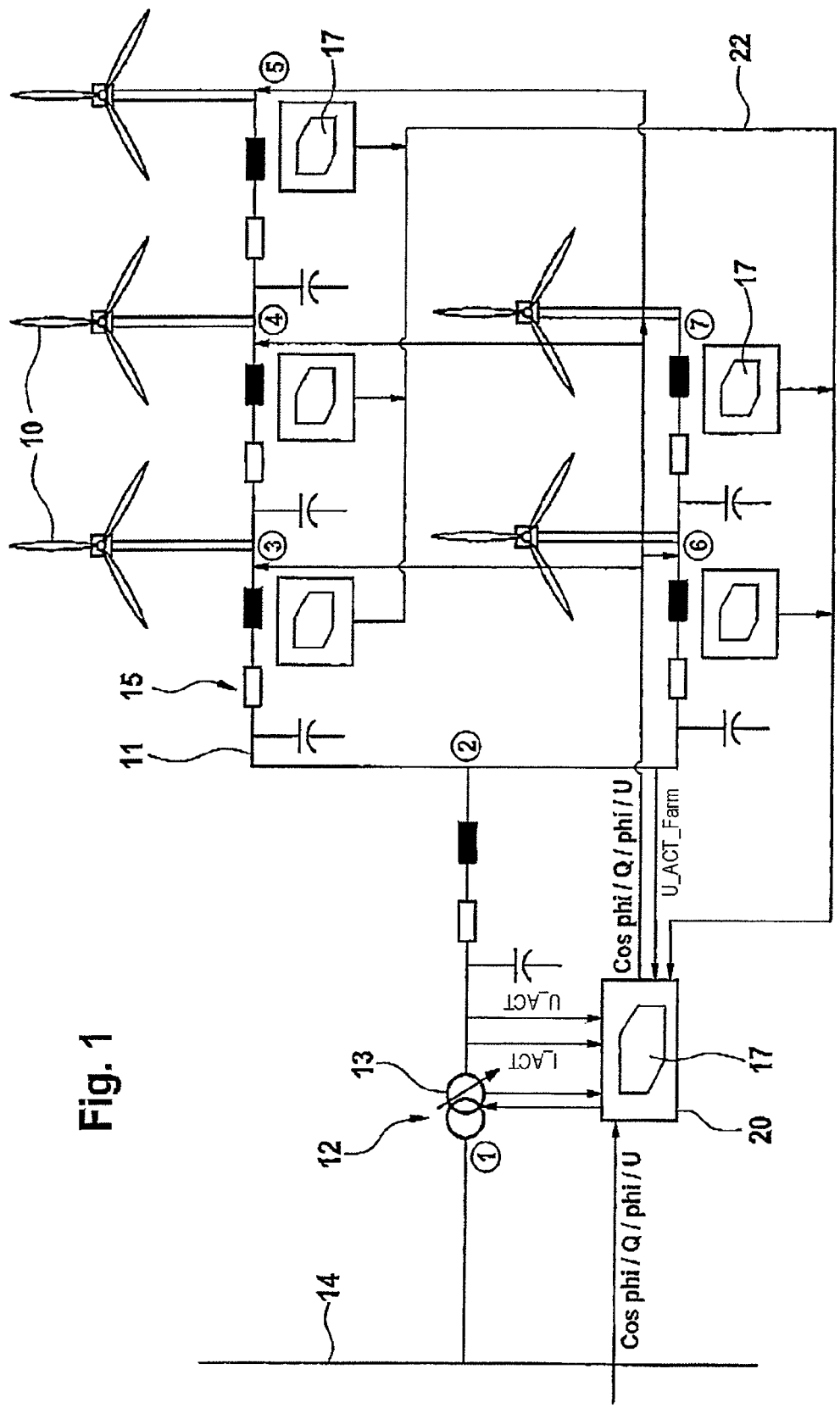
FIG. 1 shows a wind farm according to the invention.

A wind farm as shown in FIG. 1 has a plurality of wind energy installations 10. Each wind energy installation 10 has a rotor whose rotation is converted to electrical power via a generator which is not illustrated. The electrical power, which is produced by the generator at a voltage of, for example, 690 V, is transformed to a medium voltage of 20 kV, in the wind energy installation 10 itself. The electrical power is fed at the voltage of 20 kV into a wind-farm-internal network 11, and is passed via the wind-farm-internal network 11 to a substation 12. The sections of the wind-farm-internal network 11 are illustrated in the form of equivalent circuits 15 in order to indicate that they may each act as an inductance, a capacitance and a resistance. A transformer having a stepping switch 13 is provided in the substation 12, and is used to step up the electrical power from the 20 kV medium voltage to a high voltage of 110 kV.

In the substation 12, the electrical power is transmitted to an external network 14. The external network is normally a public power distribution network, via which the electrical power is distributed to the consumers. Particularly in the case of an off-shore wind farm, the electrical power may first of all be transmitted via a stepping switch to a connecting line before it is transmitted via a further stepping switch, which is arranged at the other end of the connecting line, to the external network. It is possible for the two stepping switches to be switched matched to one another when the method according to the invention is being carried out, with both stepping switches being regarded as being part of the wind farm, for the purposes of the invention. This makes it possible to decouple the voltage in the wind-farm-internal network 11 from the voltage in the public power distribution network, and to select the voltage in the wind-farm-internal network 11 independently of the voltage in the public power distribution network. It is also possible to counteract any voltage change which occurs at only one end of the connecting line by operation of one of the two stepping switches.

A wind farm regulator 20 is supplied with various information items relating to the state of the wind farm. The information comprises the actual voltage and the actual current in the wind-farm-internal network 11, external requirements for the voltage and the wattless component with which the electrical power is intended to be transmitted to the external network 14, as well as information about the state of the wind energy installations 10. The wind farm regulator 20 processes this information and uses it to calculate requirements which are transmitted to the components of the wind farm. The stepping switch 13 therefore receives a requirement for the step-up ratio. Requirements for the voltage and the wattless component are set for the wind energy installations 10.

Figure 2:
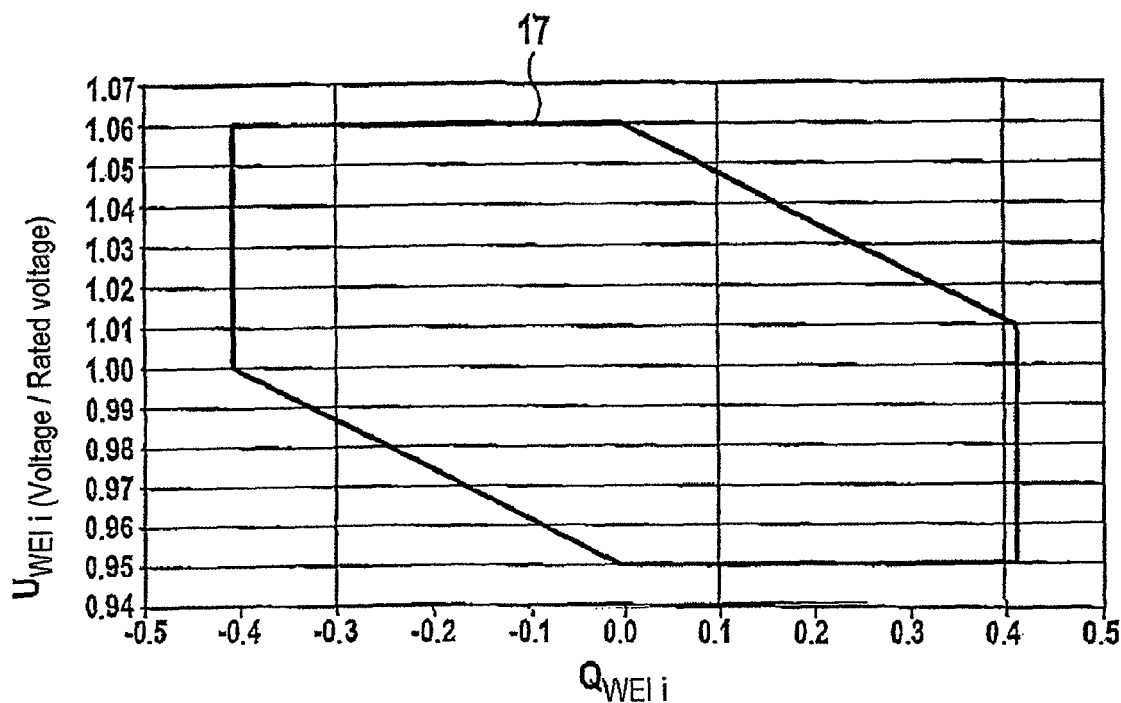
FIG. 2 shows a U-Q family of characteristics for a wind energy installation in the wind farm according to the invention.

FIG. 2 shows a U-Q family of characteristics 17 which indicates the operating range within which a wind energy installation 10 can feed electrical power into the wind-farm-internal network 11. The voltage U is indicated in normalized units on one axis in the U-Q family of characteristics 17, with a value of 1.00 corresponding to the rated voltage. The wattless component Q is plotted, likewise in normalized units, on the other axis, with the current and voltage being in phase when the value of Q is 0.0. Only real power is therefore transmitted when Q=0.0, and the wattless component is 0. A capacitive wattless component is fed in when the values of Q are positive, and an inductive wattless component is fed in when the values of Q are negative. If the wind energy installation were able to provide wattless components to the same extent over the entire permissible voltage range between 0.95 and 1.06, then the U-Q family of characteristics 17 would be rectangular. However, as explained above, the capability to feed in an inductive wattless component is reduced when the voltages are low. In contrast, when the voltages are at the upper end of the permissible range, the capability to feed in a capacitive wattless component is reduced. In comparison to a rectangle, the bottom-left corner and the top-right corner are therefore missing, and the family of characteristics approximates to the shape of a rhombus.

If the voltage U and the wattless component Q with which the wind energy installation 10 feeds electrical power into the wind-farm-internal network 11 are determined, then it is possible to designate in the U-Q family of characteristics 17 in FIG. 2 the operating point at which the wind energy installation 10 is operating. In general, an operating point in the center of the U-Q family of characteristics 17 in fact indicates a low electrical load level on the wind energy installation 10. An operating point close to the limit of the U-Q family of characteristics 17 is an indication of a high electrical load level on the wind energy installation 10. The figure shown applies to a high or normal real-power output. A different limit function would be used for the low real-power output range for which, for example, the operating range of the U-Q diagram is enlarged to the left and right.

Figure 3:
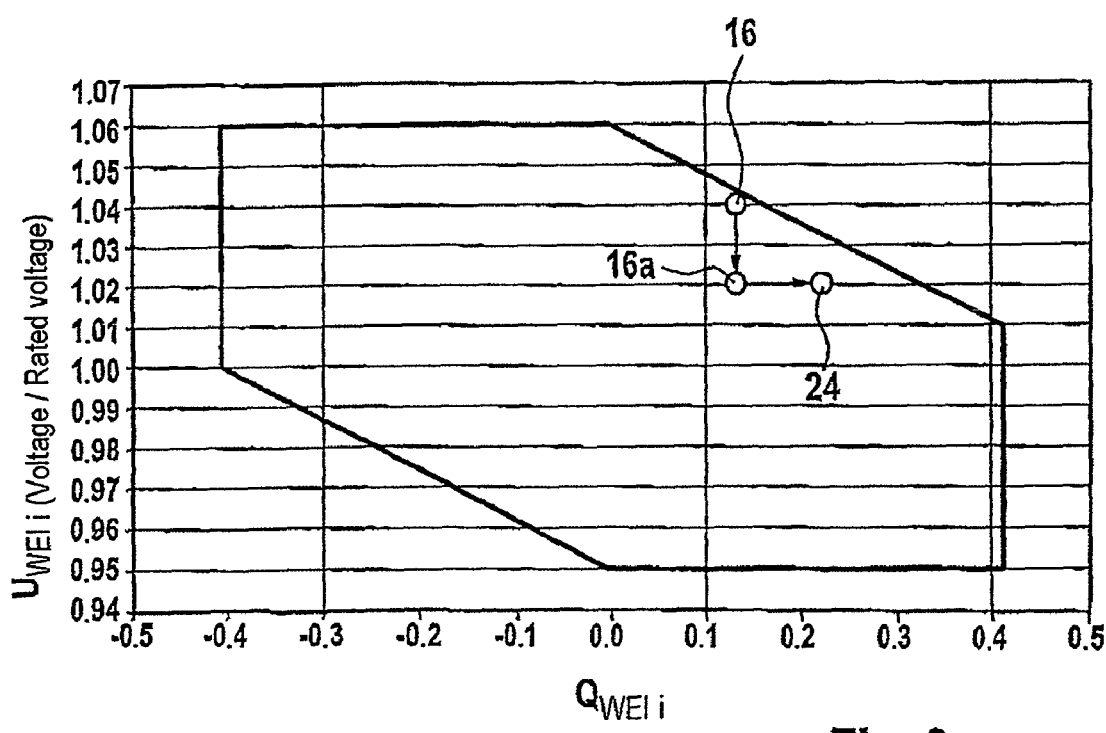
FIGS. 3, 4 show examples of operating points of wind energy installations based on the U-Q family of characteristics shown in FIG. 2.

One possible operating point 16 of a wind energy installation 10 is shown on the U-Q family of characteristics in FIG. 3. The voltage U is 1.04 of the rated voltage, and a sufficient amount of capacitive wattless component is fed in that the operating point is directly adjacent to the limit of the U-Q family of characteristics. The operating point 16 can be maintained provided that the wind energy installation 10 can supply just as much wattless component as is required.

In a different case, the wind energy installation 10 would actually have to supply more wattless component in order to comply with the wattless component requirement, but cannot do this because of the high electrical load level. An increase in the wattless component would result in an operating point outside the U-Q family of characteristics, and therefore outside the permissible range. In this case, the wind energy installation signals its high electrical load level to the wind farm regulator 20. On the basis of the method according to the invention, the wind farm regulator 20 can react by switching the stepping switch 13 through one step, as a result of which the voltage in the wind-farm-internal network 11 falls. The operating point 16 changes to the operating point 16a.

The wind energy installation regulator determines that the electrical load level on the wind energy installation has fallen to the operating point 16a in comparison to the operating point 16. If the capacitive wattless component at the operating point 16a were not to be sufficient, then the wind energy installation regulator would set the operating point 24. At the operating point 24, and in contrast to the operating point 16, the wind energy installation is therefore able to cope with a requirement for an increased capacitive wattless component. At the same time, the electrical load level at the operating point 24 is lower than at the operating point 16, because the operating point 24 is still some way from the limits of the U-Q family of characteristics. The operation of the stepping switch 13 according to the invention therefore first of all results in the operating point of the wind energy installation being shifted so as to reduce the electrical load level. Some of the freedom gained in this way is used to feed in more capacitive wattless components.

Figure 4:
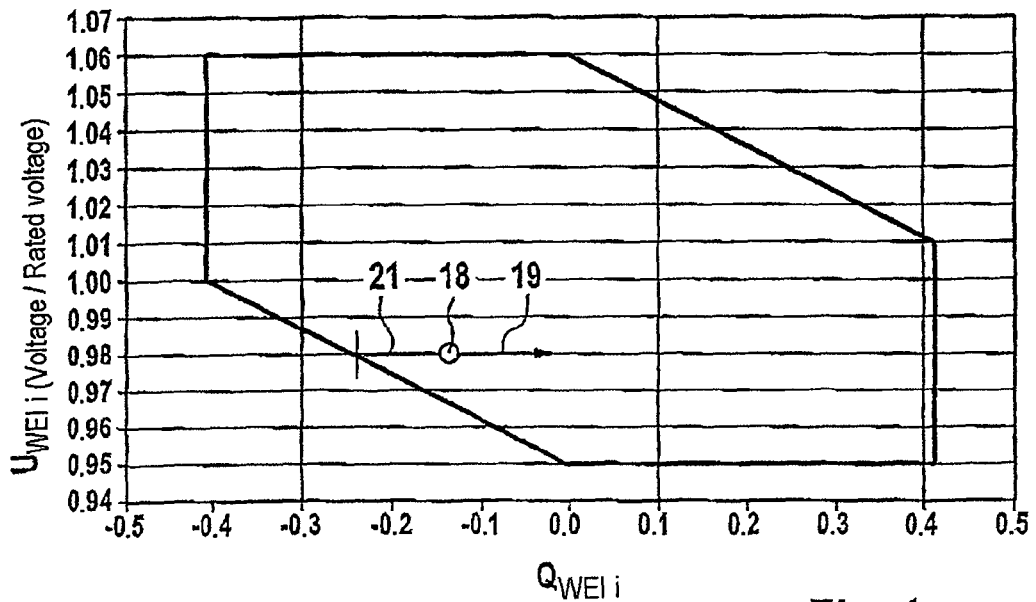

At the operating point 18 shown in FIG. 4, the voltage U is 98% of the rated voltage, and an inductive wattless component is fed into the wind-farm-internal network 11. If the wattless component requirement were to change such that the wind energy installation 10 had to feed in a smaller inductive wattless component than previously, then the wind energy installation could cope with this requirement without any problems. The wind energy installation regulator would shift the operating point 18 to the right, as indicated by the arrow 19. The wattless component that is fed in can be reduced at any time as far as the axis Q=0.0.

If, conversely, a greater inductive wattless component is required, then the wind energy installation regulator must shift the operating point 18 further to the left. This is possible within certain limits because the operating point 18 is some distance from the limit of the U-Q family of characteristics. The distance annotated 21 between the operating point 18 and the limit of the U-Q family of characteristics indicates the wattless component margin which the wind energy installation still has at the operating point 18. If the wattless component margin is too small to meet the requirements to be expected for the inductive wattless component, then an appropriate signal can be sent to the wind farm regulator 20.

A U-Q family of characteristics 17 is stored in each wind energy installation 10 in the wind farm shown in FIG. 1. The wind farm regulator 20 receives a signal from each wind energy installation 10 via a data line 22 when the wind energy installation 10 identifies an increased electrical load level on the basis of the U-Q family of characteristics 17. Since the stepping switch 13 is subject to major wear, and an excessive number of switching processes should in consequence be avoided, the stepping switch 13 is not operated immediately in the method according to the invention simply because a single wind energy installation is signaling a high electrical load level. In fact, suitable criteria are predetermined for the wind farm regulator 20, which it can use to decide whether the savings resulting from reducing the electrical load level on the wind energy installations 10 are greater than the loss resulting from the wear on the stepping switch 13.

The wind farm shown in FIG. 1 has five wind energy installations 10. By way of example, operation of the stepping switch 13 may be indicated when the wind farm regulator 20 receives a signal indicating an increased electrical load level from three of the five wind energy installations. Alternatively, the stepping switch 13 can be switched when a signal is received from two of the wind energy installations that they are very well away from the instantaneous operating point and cannot comply with the wattless component requirement. The wind farm regulator 20 obtains additional criteria by comparing the actual values of the voltage and the wattless component in the wind-farm-internal network 11 with a U-Q family of characteristics 17 that is stored in the wind farm regulator 20.

If the wind farm regulator 20 comes to the conclusion that operation of the stepping switch 13 is indicated, then it passes an appropriate requirement to the stepping switch 13. The switching of the stepping switch 13 changes the step-up ratio between the voltage in the external network 14 and the voltage in the wind-farm-internal network 11, and this leads to a change in the voltage in the wind-farm-internal network 11. At the same time as the command to the stepping switch 13, the wind farm regulator 20 transmits new nominal values for the voltage and/or the wattless component to the wind energy installations 10, in order to inform the wind energy installations that this is a desired change in the wind-farm-internal network. Otherwise, the regulators of the wind energy installations 10 would attempt to counteract the change.

Figure 5:
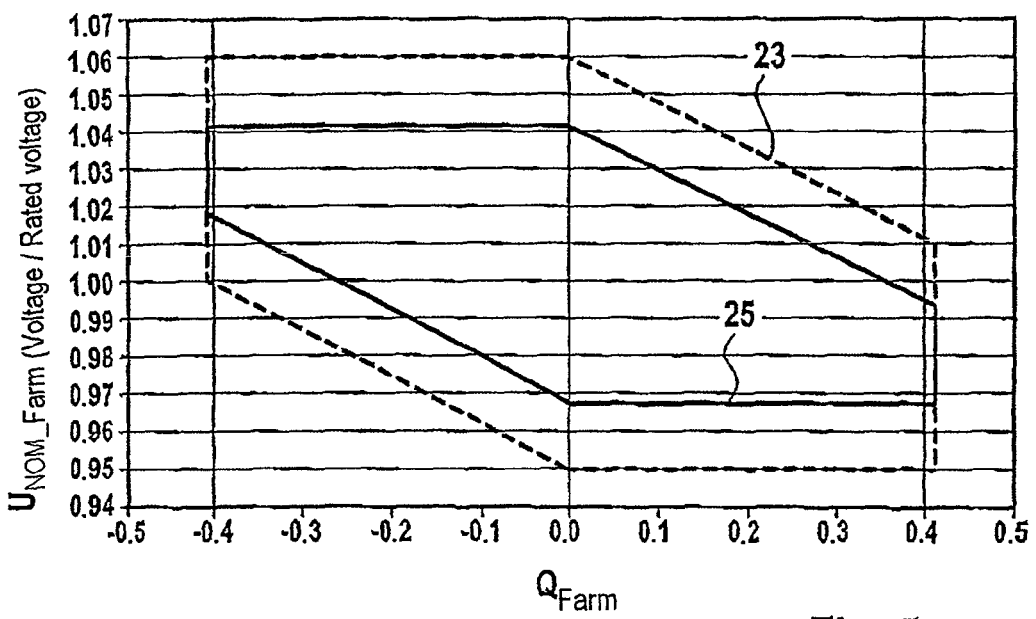
FIG. 5 shows an alternative U-Q family of characteristics.

FIG. 5 shows a further U-Q family of characteristics which allows a stepped reaction. If the operating point is in the inner area 25 of the U-Q family of characteristics, which is bounded by the solid line, then the electrical load level on the wind energy installation is low, and no measures are required to reduce the electrical load level. If the operating point is in the outer area 23 of the U-Q family of characteristics, then, although the electrical load level on the wind energy installation is greater, it is, however, not yet sufficiently high to demand an immediate reaction. The wind energy installation can be operated for a short time at this operating point. Only if the operating point does not return to the inner area 25 within a time period of, for example, more than 10 minutes is it possible to operate the stepping switch 13. If, in contrast, the operating point is outside the outer area 23, then the wind energy installation is electrically overloaded, and the stepping switch 13 is operated immediately.

In one alternative embodiment, the stepping switch 13 is not switched when the operating point is in the inner area 25 of the U-Q family of characteristics. If the operating point is in the outer area 23 of the U-Q family of characteristics, the stepping switch 13 is switched through one step. In the event of an operating point outside the outer area 23, the stepping switch 13 is switched by two steps in one switching process. In all cases, the method according to the invention makes it possible to reduce the electrical load level on the wind energy installations.

The invention claimed is:

1. A method for operating a wind farm, in which electrical power produced in the wind farm is transported via a wind-farm-internal network to a substation and in which, before being transferred to an external network, the electrical power is transformed to a voltage which is higher by a selectable step-up ratio than the voltage in the wind-farm-internal network, the method comprising:
    determining an electrical load level on a wind energy installation in the wind farm;
    determining a wattless component margin between the electrical load level and the system limits of the wind energy installation; and
    adjusting the step-up ratio as a function of whether the predetermined wattless component margin is maintained.

2. The method of claim 1, wherein the electrical load level on the wind energy installation is determined by comparison of a voltage U and a wattless component Q of electrical power produced in the wind energy installation with a U-Q family of characteristics.

3. The method of claim 2, further comprising determining the wattless component margin of the wind energy installation based on the U-Q family of characteristics.

4. The method of claim 1, wherein the step-up ratio is adjusted only when an electrical load level for each one of a plurality of wind energy installations in the wind farm has exceeded a predetermined limit.

5. The method of claim 1, wherein, when the step-up ratio is adjusted, new nominal values are predetermined for at least one of a voltage and a wattless component for the wind energy installation.

6. The method of claim 1, further comprising adjusting a voltage level in the wind-farm-internal network by connecting or disconnecting a wattless-component source which is independent of the wind energy installation.

7. A wind farm, comprising:
a wind energy installation;
a substation at which electrical power produced in the wind farm is transmitted from a wind-farm-internal network to an external network;
a stepping switch configured to adjust a step-up ratio between a voltage in the wind-farm-internal network and a voltage in the external network; and
a wind farm regulator configured to preset the step-up ratio on the stepping switch as a function of whether a predetermined wattless component margin between an electrical load level on the wind energy installation and the system limits of the wind energy installation is maintained.

8. The wind farm of claim 7, further comprising a memory configured to store a U-Q family of characteristics.

9. The wind farm of claim 8, wherein the wind energy installation comprises a logic module configured to compare a voltage U and a wattless component Q of electrical power emitted by the wind energy installation with the U-Q family of characteristics.

10. The wind farm of claim 8, wherein the wind farm regulator comprises a logic module configured to compare a voltage U and a wattless component Q of the wind-farm-internal network with the U-Q family of characteristics.

11. The wind farm of claim 7, wherein the wind farm regulator comprises an assessment module configured to use at least one of an instantaneous real power output, a voltage mean value, and a state variable of the stepping switch to decide whether the stepping switch is switched.

12. The wind farm of claim 7, wherein the stepping switch is configured to carry out an adjustment over a number of switching stages in one switching process.

13. The wind farm of claim 7, further comprising a wattless component source, which is independent of the wind energy installation, configured to influence the voltage in the wind-farm-internal network.

14. The wind farm of claim 7, wherein the electrical power is transmitted via a connecting line to the external network, the stepping switch comprises a first stepping switch arranged at a first end of the connecting line and a second stepping switch arranged at a second end of the connecting line, and the first and second stepping switches are regulated by the wind farm regulator.

* * * * *